United States Patent
Yoshioka et al.

(10) Patent No.: US 12,402,155 B2
(45) Date of Patent: Aug. 26, 2025

(54) TERMINAL, SYSTEM, AND COMMUNICATION METHOD FOR DETERMINING CONTROL OF RETRANSMISSION

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 680 days.

(21) Appl. No.: 17/637,397

(22) PCT Filed: Sep. 12, 2019

(86) PCT No.: PCT/JP2019/035984
§ 371 (c)(1),
(2) Date: Feb. 22, 2022

(87) PCT Pub. No.: WO2021/048990
PCT Pub. Date: Mar. 18, 2021

(65) Prior Publication Data
US 2022/0287044 A1   Sep. 8, 2022

(51) Int. Cl.
*H04W 72/542*   (2023.01)
*H04L 1/1607*   (2023.01)
*H04L 1/1812*   (2023.01)
*H04L 5/00*   (2006.01)
*H04W 4/46*   (2018.01)
(Continued)

(52) U.S. Cl.
CPC ......... *H04W 72/542* (2023.01); *H04L 1/1812* (2013.01); *H04L 5/0053* (2013.01); *H04W 72/02* (2013.01)

(58) Field of Classification Search
None
See application file for complete search history.

(56) References Cited

U.S. PATENT DOCUMENTS

2017/0347394 A1*  11/2017  Yasukawa .............. H04L 1/189
2018/0213430 A1    7/2018  Yokomakura et al.
2021/0266133 A1*   8/2021  Zhang ................... H04L 1/1861
(Continued)

FOREIGN PATENT DOCUMENTS

| WO | 2016/076301 A1 | 5/2016 |
| WO | 2017/022802 A1 | 2/2017 |
| WO | 2018/029976 A1 | 2/2018 |

OTHER PUBLICATIONS

R1-1901903, 3GPP TSG RAN WG1 Meeting #96, Discussion on physical layer procedures in NR V2X (Year: 2019).*
(Continued)

*Primary Examiner* — Jeffrey M Rutkowski
*Assistant Examiner* — Ning Li
(74) *Attorney, Agent, or Firm* — Osha Bergman Watanabe & Burton LLP

(57) ABSTRACT

A terminal comprises a transmission unit configured to transmit a CSI (Channel State Information) request and a reference signal for use in CSI measurement to another terminal, a reception unit configured to receive a CSI report that is based on a measurement result of the reference signal from the another terminal, and a control unit configured to determine, according to a communication state, control related to a HARQ (Hybrid automatic repeat request) response corresponding to the CSI report.

4 Claims, 11 Drawing Sheets

(51) Int. Cl.
  *H04W 72/02* (2009.01)
  *H04W 92/18* (2009.01)

(56) References Cited

U.S. PATENT DOCUMENTS

| | | | | |
|---|---|---|---|---|
| 2021/0345360 | A1* | 11/2021 | Yeo | H04W 72/20 |
| 2021/0377912 | A1* | 12/2021 | El Hamss | H04L 1/1854 |
| 2021/0377927 | A1 | 12/2021 | Kusashima et al. | |
| 2021/0377989 | A1* | 12/2021 | Chae | H04L 1/1861 |
| 2022/0085923 | A1* | 3/2022 | Ye | H04L 1/1854 |
| 2022/0150730 | A1* | 5/2022 | Freda | H04L 1/1812 |
| 2022/0159674 | A1* | 5/2022 | Deng | H04W 72/566 |
| 2022/0191725 | A1* | 6/2022 | Ashraf | H04L 5/0053 |
| 2022/0201654 | A1* | 6/2022 | Lee | H04W 72/20 |
| 2022/0239417 | A1* | 7/2022 | Cheng | H04L 1/1835 |
| 2022/0264590 | A1* | 8/2022 | Han | H04L 1/1854 |
| 2022/0303969 | A1* | 9/2022 | Hwang | H04L 5/0044 |
| 2022/0322296 | A1* | 10/2022 | Yu | H04L 1/1861 |

OTHER PUBLICATIONS

International Search Report issued in PCT/JP2019/035984 on Apr. 21, 2020 (5 pages).
Written Opinion of the International Searching Authority issued in PCT/JP2019/035984 on Apr. 21, 2020 (4 pages).
3GPP TS 36.211 V15.6.0; "3rd Generation Partnership Project; Technical Specification Group Radio Access Network; Evolved Universal Terrestrial Radio Access (E-UTRA); Physical channels and modulation (Release 15)"; Jun. 2019 (239 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TSG RAN WG1 #98; R1-1909190 "Sidelink physical layer procedure for NR V2X" NTT Docomo, Inc.; Prague, CZ, Aug. 26-30, 2019 (13 pages).
3GPP TSG RAN WG1 #96; R1-1902596 "Discussion on Physical Layer Procedures for NR V2X Sidelink" InterDigital Inc.; Athens, Greece, Feb. 25-Mar. 1, 2019 (7 pages).
Office Action issued in Australian Application No. 2019466108; Dated Mar. 28, 2025 (3 pages).

* cited by examiner

TERMINAL, SYSTEM, AND COMMUNICATION METHOD FOR DETERMINING CONTROL OF RETRANSMISSION

TECHNICAL FIELD

The present invention relates to a terminal in a radio communication system.

BACKGROUND ART

In LTE (Long Term Evolution) and successor systems to LTE (for example, LTE-A (LTE Advanced) and NR (New Radio) (also referred to as 5G)), D2D (Device to Device) technologies have been discussed for direct communication between terminals without using a base station (for example, Non-Patent Document 1).

In D2D, traffic between a terminal and a base station is reduced, and communications between terminals are enabled even in a case where the base station become incommunicable, for example, at the time of a disaster. In 3GPP (3rd Generation Partnership Project), D2D is referred to as a "sidelink". However, the term "D2D" is used herein as a more general term. However, the term "sidelink" will be used in an embodiment to be described below as necessary.

D2D communication is generally classified into D2D discovery for discovering other communicable terminals, and D2D communication (also referred to D2D direct communication, terminal-to-terminal direct communication, and the like) for direct communication between terminals. D2D communication, D2D discovery, and the like are hereinafter simply referred to D2D when they are not specifically distinguished. Signals transmitted and received in D2D are referred to as D2D signals. Various use cases of services related to V2X (Vehicle to Everything) in NR have been discussed (for example, Non-Patent Document 2).

RELATED-ART DOCUMENTS

Non-Patent Document

Non-Patent Document 1: 3GPP TS 36.211 V15.6.0 (2019 June)
Non-Patent Document 2: 3GPP TR 22.886 V15.1.0 (2017 March)

SUMMARY OF THE INVENTION

Problem to be Solved by the Invention

Supporting a HARQ (Hybrid automatic repeat request) has been discussed in the terminal-to-terminal direct communication in NR-V2X. However, it is likely that there occurs an overlap between PSFCHs (Physical Sidelink Feedback Channels) or between a PSFCH and another channel in a communication state where a great number of PSFCHs are required as channels in which a HARQ response of terminal-to-terminal direct communication is transmitted.

The present invention has been made in view of the foregoing. An object is to determine control of retransmission according to a communication state in terminal-to-terminal direct communication.

Means to Solve the Problem

According to the disclosed technique, a terminal that includes a transmission unit configured to transmit a CSI (Channel State Information) request and a reference signal for use in CSI measurement to another terminal, a reception unit configured to receive a CSI report that is based on a measurement result of the reference signal from the another terminal, and a control unit configured to determine, according to a communication state, control related to a HARQ (Hybrid automatic repeat request) response corresponding to the CSI report, is provided.

Advantage of the Invention

According to the disclosed technique, it is possible to determine control of retransmission according to a communication state in terminal-to-terminal direct communication.

MODE FOR CARRYING OUT THE INVENTION

Hereinafter, an embodiment of the present invention will be described with reference to the drawings. The embodiment described below is an example, and the embodiment to which the present invention is applied is not limited to the following embodiment.

In operating a radio communication system in the embodiment of the present invention, existing techniques are used appropriately. However, the existing technology is, for example, an existing LTE, but is not limited to an existing LTE. Also, the term "LTE" as used herein is to have a broad meaning, including LTE-Advanced and forms following LTE-Advanced (e.g., NR), or wireless LAN (Local Area Network) unless otherwise indicated.

In the embodiment of the present invention, the duplex method may be a TDD (Time Division Duplex) method, an FDD (Frequency Division Duplex) method, or other method (e.g., Flexible Duplex, etc.).

In the embodiment of the present invention, to "Configure" the wireless parameter or the like may be to "Pre-configure" a predetermined value, or may be configuration of a wireless parameter indicated by a base station 10 or a terminal 20.

Figure 1:
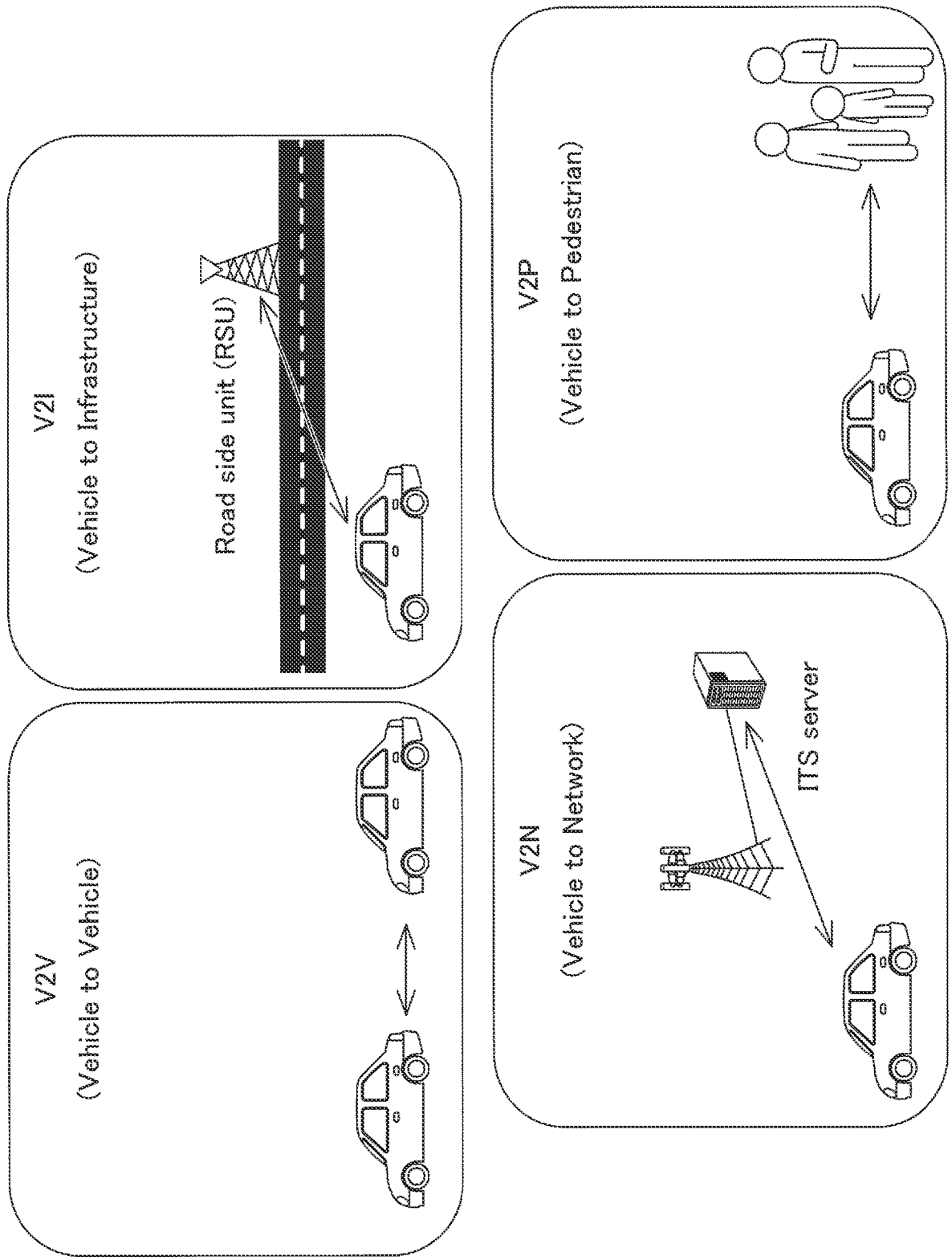
FIG. 1 is a diagram for explaining V2X.

FIG. 1 is a diagram for explaining V2X. In 3GPP, it is discussed to realize V2X (Vehicle to Everything) or eV2X (enhanced V2X) by extending the above-described D2D functions, and the specification development is in progress. As illustrated in FIG. 1, V2X is a part of ITS (Intelligent Transport Systems), and is a common term for V2V (Vehicle to Vehicle) that means a communication mode performed between automobiles, V2I (Vehicle to Infrastructure) that means a communication mode performed between an automobile and a road-side unit (RSU: Road-Side Unit) installed at a road side, V2N (Vehicle to Network) that means a communication mode performed between an automobile and an ITS server, and V2P (Vehicle to Pedestrian) that means a communication mode performed between an automobile and a mobile terminal carried by a pedestrian.

Also, V2X in which LTE or NR cellular communication and terminal-to-terminal communication are used has been discussed in 3GPP. V2X in use of cellular communication is also referred to as cellular V2X. In V2X of NR, discussion has been held to realize increased capacity, lower latency, higher reliability and QoS (Quality of Service) control.

For V2X of LTE or NR, it is assumed that the specification development is not limited to the 3GPP specifications. For example, it is assumed that the discussions will be held for: achieving interoperability; achieving cost reduction by implementing higher layers; developing a method of combining or switching multiple RATs (Radio Access Technologies); corresponding to regulations in respective countries; developing methods of data acquisition and distribution of a V2X platform of LTE or NR; and developing a method of managing and using a database.

In the present embodiment, an arrangement in which a communication device is mounted on a vehicle is contemplated mainly. However, the embodiment of the present invention is not limited to this arrangement. For example, a communication device may be a terminal carried by a person, may be a device to be mounted on a drone or airplane, and may be a base station, RSU, relay station (relay node), terminal with a scheduling function, or the like.

It is noted that an SL (sidelink) may be distinguished from an UL (uplink) or DL (downlink) on the basis of any one or a combination of (1) to (4) below. An SL may be referred to with another term.
 (1) Arrangement of a resource in a time region
 (2) Arrangement of a resource in a frequency region
 (3) Synchronization signal to be referred to (including an SLSS (sidelink synchronization signal))
 (4) Reference signal for use in path-loss measurement for controlling power in transmission.

Also, in relation to OFDM (Orthogonal Frequency Division Multiplexing) in SL or UL, it is possible to apply any one of CP-OFDM (Cyclic-Prefix OFDM), DFT-S-OFDM (Discrete Fourier Transform-Spread-OFDM), OFDM without being transform-precoded, or transform-precoded OFDM.

In an SL of LTE, a Mode 3 and Mode 4 are defined in relation to allocating a resource of the SL to the terminal 20. In the Mode 3, a transmission resource is allocated dynamically by DCI (Downlink Control Information) sent from the base station 10 to the terminal 20. Also, SPS (Semi Persistent Scheduling) is possible in the Mode 3. In the Mode 4, the terminal 20 selects a transmission resource autonomously from a resource pool.

It is noted that a slot in the embodiment of the present invention may be read as a symbol, minislot, subframe, radio frame, or TTI (Transmission Time Interval). Also, a cell in the embodiment of the present invention may be read as a cell group, carrier component, BWP, resource pool, resource, RAT (Radio Access Technology), system (inclusive of wireless LAN), or the like.

Figure 2:
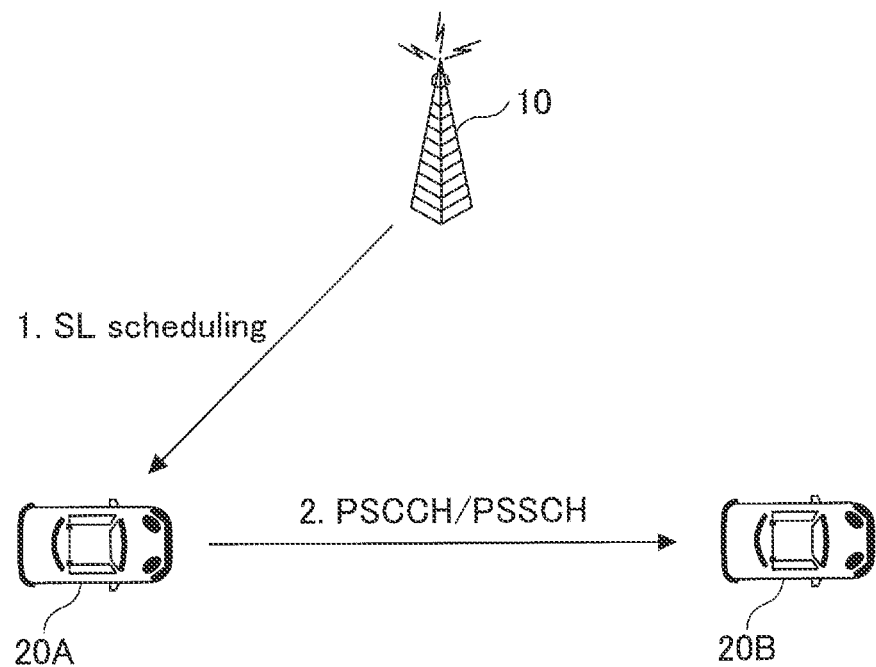
FIG. 2 is a diagram for explaining an example (1) of a transmission mode in V2X.

FIG. 2 is a diagram for explaining an example (1) of a transmission mode in V2X. In the transmission mode of the sidelink communication illustrated in FIG. 2, the base station 10 in a step 1 transmits sidelink scheduling to a terminal 20A. Then the terminal 20A transmits a PSCCH (Physical Sidelink Control Channel) and PSSCH (Physical Sidelink Shared Channel) to a terminal 20B on the basis of the received scheduling (step 2). The transmission mode of the sidelink communication in FIG. 2 may be referred to as a sidelink transmission mode 3 in LTE. In the sidelink transmission mode 3 in LTE, sidelink scheduling of Uu base is performed. Uu is a radio interface between the UTRAN (Universal Terrestrial Radio Access Network) and UE (User Equipment). Also, the transmission mode of the sidelink communication in FIG. 2 may be referred to as a sidelink transmission mode 1 in NR.

Figure 3:
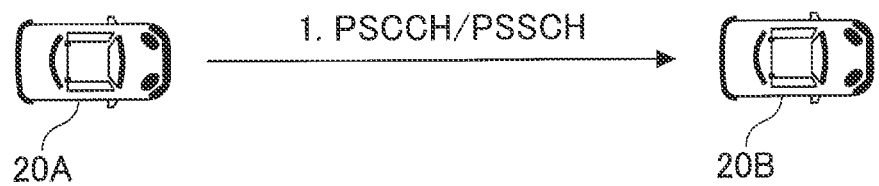
FIG. 3 is a diagram for explaining an example (2) of a transmission mode in V2X.

FIG. 3 is a diagram for explaining an example (2) of a transmission mode in V2X. In the transmission mode of the sidelink communication illustrated in FIG. 3, the terminal 20A in a step 1 transmits a PSCCH and PSSCH to the terminal 20B by use of a resource selected autonomously. The transmission mode of the sidelink communication in FIG. 3 may be referred to as a sidelink transmission mode 4 in LTE. In the sidelink transmission mode 4 in LTE, the UE itself performs selection of a resource.

Figure 4:
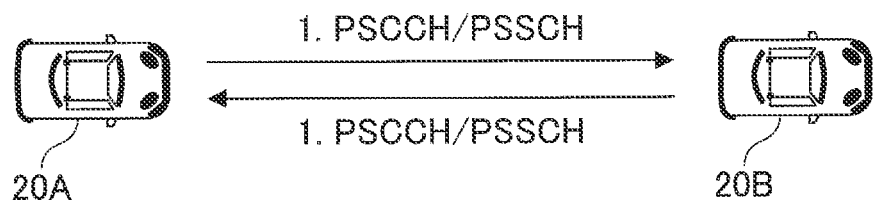
FIG. 4 is a diagram for explaining an example (3) of a transmission mode in V2X.

FIG. 4 is a diagram for explaining an example (3) of a transmission mode in V2X. In the transmission mode of the sidelink communication illustrated in FIG. 4, the terminal 20A in a step 1 transmits a PSCCH and PSSCH to the terminal 20B by use of a resource selected autonomously. Similarly, the terminal 20B transmits a PSCCH and PSSCH to the terminal 20A by use of a resource selected autonomously (step 1). The transmission mode of the sidelink communication in FIG. 4 may be referred to as a sidelink transmission mode 2a in NR. In the sidelink transmission mode 2 in NR, the terminal 20 itself performs selection of a resource.

Figure 5:
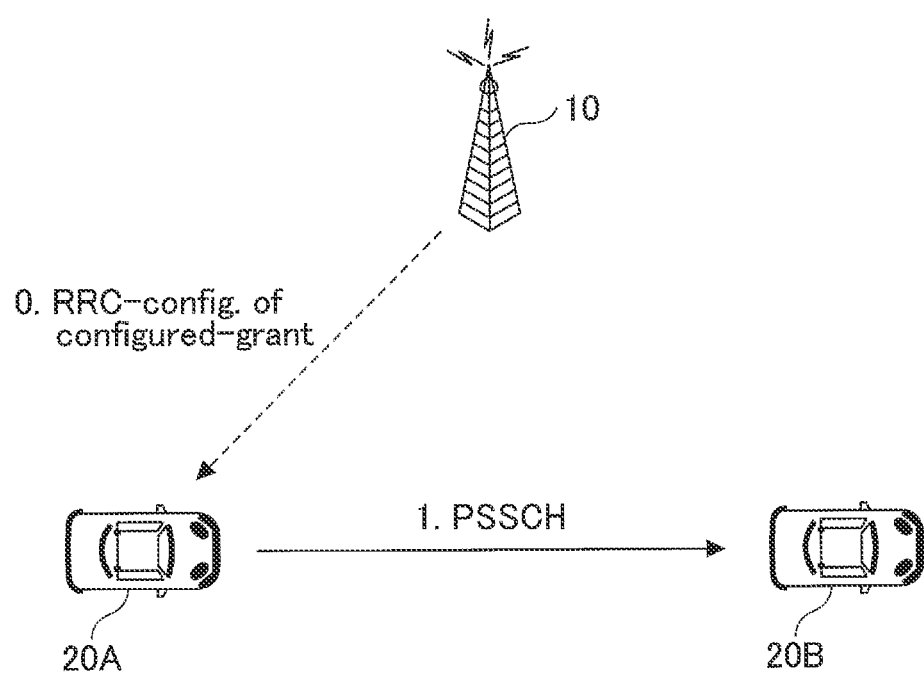
FIG. 5 is a diagram for explaining an example (4) of a transmission mode in V2X.

FIG. 5 is a diagram for explaining an example (4) of a transmission mode in V2X. In the transmission mode of the sidelink communication illustrated in FIG. 5, the base station 10 in a step 0 transmits a sidelink grant to the terminal 20A by an RRC (Radio Resource Control) configuration. Then the terminal 20A transmits a PSSCH to the terminal 20B on the basis of a received resource pattern (step 1). The transmission mode of the sidelink communication illustrated in FIG. 5 may be referred to as a sidelink transmission mode 2c in NR.

Figure 6:
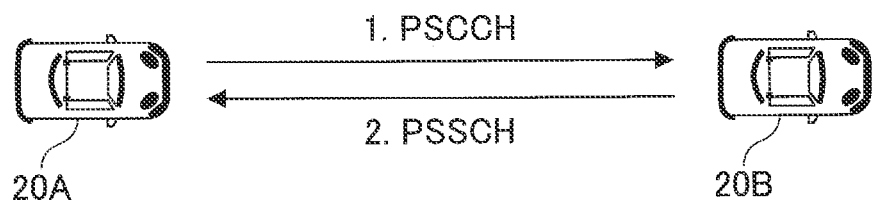
FIG. 6 is a diagram for explaining an example (5) of a transmission mode in V2X.

FIG. 6 is a diagram for explaining an example (5) of a transmission mode in V2X. In the transmission mode of the sidelink communication illustrated in FIG. 6, the terminal 20A in a step 1 transmits sidelink scheduling to the terminal 20B by a PSCCH. Then the terminal 20B transmits a PSSCH to the terminal 20A on the basis of the received scheduling (step 2). The transmission mode of the sidelink communication illustrated in FIG. 6 may be referred to as a sidelink transmission mode 2d in NR.

Figure 7:
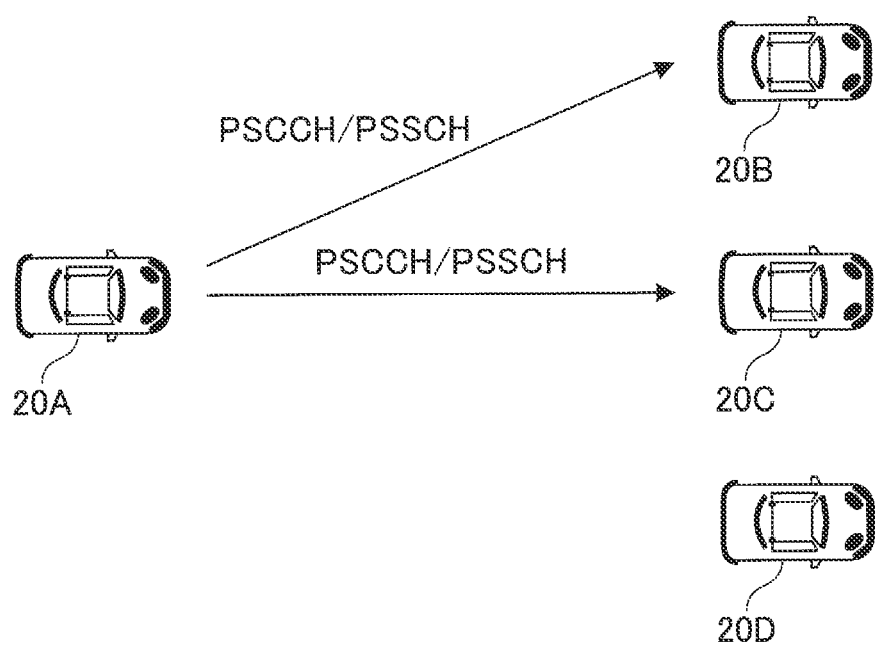
FIG. 7 is a diagram for explaining an example (1) of communication type in V2X.

FIG. 7 is a diagram for explaining an example (1) of communication type in V2X. The communication type of the sidelink illustrated in FIG. 7 is a unicast. The terminal 20A transmits a PSCCH and PSSCH to the terminal 20. In the example in FIG. 7, the terminal 20A performs a unicast to the terminal 20B, and also performs a unicast to a terminal 20C.

Figure 8:
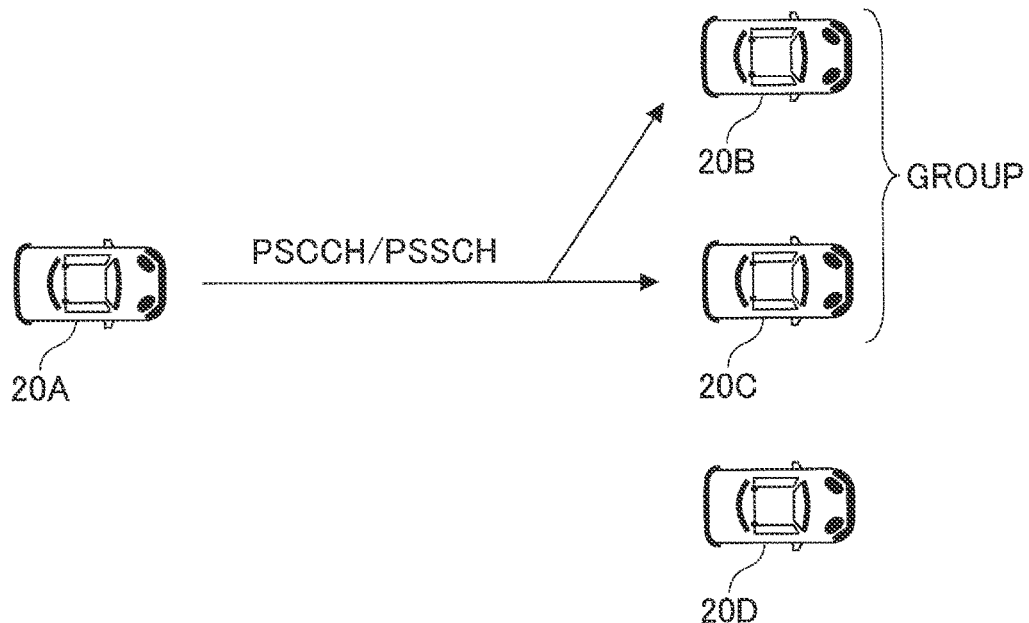
FIG. 8 is a diagram for explaining an example (2) of communication type in V2X.

FIG. 8 is a diagram for explaining an example (2) of communication type in V2X. The communication type of the sidelink illustrated in FIG. 8 is a groupcast. The terminal 20A transmits a PSCCH and PSSCH to a group to which one or a plurality of terminals 20 belong. In the example in FIG. 8, the group includes the terminal 20B and the terminal 20C. The terminal 20A performs a groupcast to the group.

Figure 9:
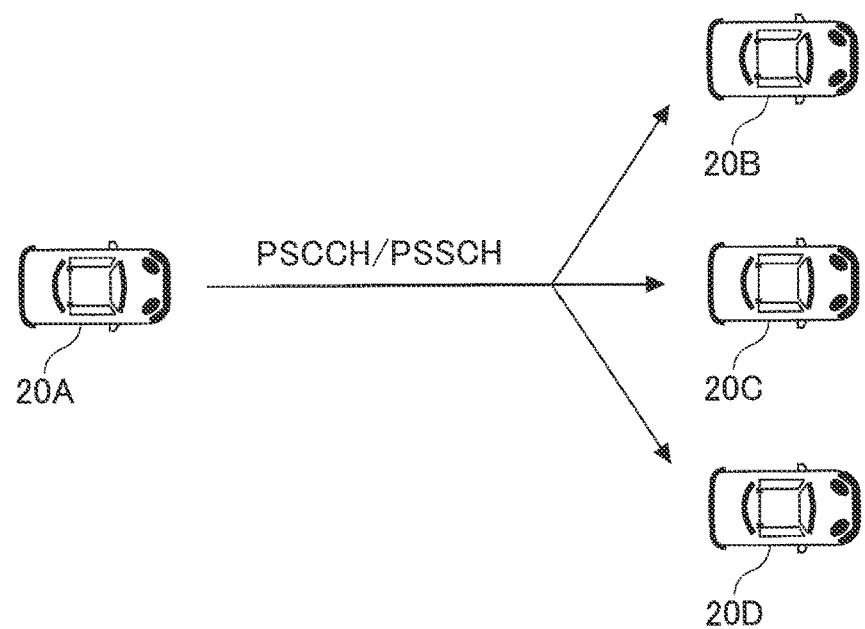
FIG. 9 is a diagram for explaining an example (3) of communication type in V2X.

FIG. 9 is a diagram for explaining an example (3) of communication type in V2X. The communication type of the sidelink illustrated in FIG. 9 is a broadcast. The terminal 20A transmits a PSCCH and PSSCH to one or a plurality of terminals 20. In the example in FIG. 9, the terminal 20A performs a broadcast to the terminal 20B, the terminal 20C and a terminal 20D. Also, the terminal 20A illustrated in FIGS. 7-9 may be referred to as a header UE.

It is assumed in NR-V2X that a HARQ is supported in a sidelink unicast and groupcast. Also, SFCI (Sidelink Feedback Control Information) including a HARQ response is defined in NR-V2X. Also, transmission of SFCI via a PSFCH (Physical Sidelink Feedback Channel) is discussed.

It is noted that the PSFCH is used in transmitting a HARQ-ACK in the sidelink in the description below. However, this is only an example. For example, a HARQ-ACK in the sidelink may be transmitted by use of a PSCCH, and a HARQ-ACK in the sidelink may be transmitted by use of a PSSCH. Also, a HARQ-ACK in the sidelink may be transmitted by use of other channels.

As described above, it is contemplated that HARQ operation is supported in NR-V2X. However, no specific suggestion has been made as to how a plurality of HARQ-ACKs are multiplexed and transmitted in correspondence with SL data and DL data in the contemplated configuration of NR-V2X. No specific suggestion has been made for a configuration of a HARQ codebook in correspondence with SL data and DL data. Furthermore, no specific suggestion has been made for a payload size to transmit a HARQ-ACK in correspondence with SL data and DL data. Therefore, there is a problem in the related art in that reporting a plurality of HARQ-ACKs cannot be performed properly.

All of information reported by the terminal 20 in a HARQ is referred to hereinafter as HARQ-ACK for the sake of expediency. A HARQ-ACK may be referred to also as HARQ-ACK information. More specifically, a codebook adapted to information of the HARQ-ACK reported from the terminal 20 to the base station 10 and the like is referred to a HARQ-ACK codebook. The HARQ-ACK codebook defines a bit train of the HARQ-ACK information. It is noted that a NACK is transmitted by "HARQ-ACK" in addition to ACK.

Figure 10:
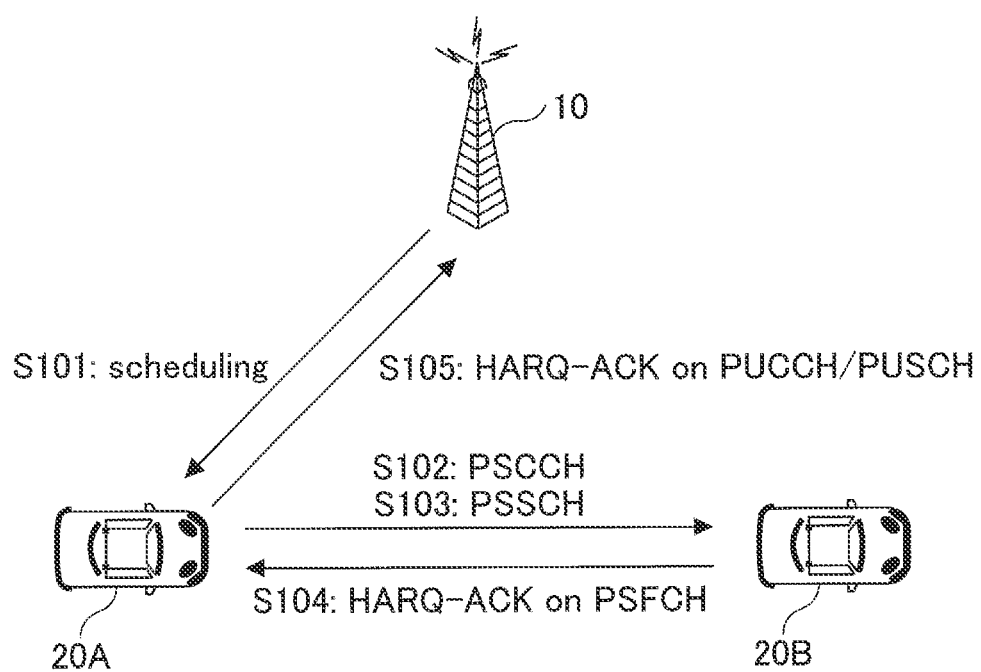
FIG. 10 is a diagram illustrating an example of a configuration and operation of a radio communication system.

FIG. 10 is a diagram illustrating an example of a configuration and operation of a radio communication system. As illustrated in FIG. 10, the radio communication system according to the embodiment of the present invention includes the base station 10, the terminal 20A and the terminal 20B. Although user equipment is great in number actually, FIG. 10 illustrates the terminal 20A and the terminal 20B as examples.

The terminal 20A, 20B and the like will be hereinafter described as simply the "terminal 20" or "user equipment" unless particularly identified. FIG. 10 illustrates a case as an example in which both of the terminal 20A and the terminal 20B are within a coverage of a cell. However, operation in the embodiment of the present invention is applicable to a case in which the terminal 20B is outside the coverage.

As described above, the terminal 20 in the present embodiment, for example, is equipment mounted on a vehicle such as an automobile, and has a cellular communication function as UE in LTE or NR, and a sidelink function. The terminal 20 may be a generally used portable terminal (smartphone and the like). Also, the terminal 20 may be an RSU. This RSU may be a UE-type RSU with a UE function, or gNB-type RSU with a function of a base station apparatus.

The terminal 20 is not required to be equipment with one housing. For example, even if various sensors are separately disposed in a vehicle, equipment including those various sensors is the terminal 20.

Processing contents of data of transmission of the sidelink of the terminal 20 are basically the same as processing contents of UL transmission in LTE or NR. For example, the terminal 20 scrambles codewords of the data of transmission, creates complex-valued symbols by modulation, maps those complex-valued symbols (signal of transmission) in one or two layers, and performs precoding. Then the terminal 20 maps the precoded complex-valued symbols to a resource element, creates the signal of transmission (for example, complex-valued time-domain SC-FDMA signal), and transmits the signal of transmission via each antenna port.

Also, the base station 10 has a cellular communication function as a base station in LTE or NR, and a function enabling communication of the terminal 20 in the present embodiment (for example, resource pool configuration, resource allocation, and the like). Furthermore, the base station 10 may be an RSU (gNB type RSU).

In a radio communication system according to the embodiment of the present invention, a signal waveform used by the terminal 20 for SL or UL may be OFDMA, or SC-FDMA, or other waveforms.

In a step S101, the base station 10 performs SL scheduling for the terminal 20A by transmitting DCI (Downlink Control Information) via a PDCCH. The DCI for SL scheduling is hereinafter referred to as SL scheduling DCI for the sake of expediency.

Also, it is contemplated in the step S101 that the base station 10 transmits DCI for performing DL scheduling (which may be referred to as DL allocation) via a PDCCH to the terminal 20A. The DCI for DL scheduling is hereinafter referred to as DL scheduling DCI for the sake of expediency. The terminal 20A receiving DL scheduling DCI receives DL data via the PDSCH by use of a resource specified by the DL scheduling DCI.

In a step S102 and a step S103, the terminal 20A transmits SCI (Sidelink Control Information) via a PSCCH by use of a resource specified by the SL scheduling DCI, and transmits SL data via a PSSCH. It is noted that it is possible to specify only a resource of the PSSCH by the SL scheduling DCI. For this case, the terminal 20A, for example, may transmit SCI (PSCCH) by use of a time resource the same as the time resource of the PSSCH and a frequency resource adjacent to the frequency resource of the PSSCH.

The terminal 20B receives the SCI (PSCCH) and SL data (PSSCH) transmitted by the terminal 20A. The SCI received via the PSCCH includes information of the resource of a PSFCH with which the terminal 20B transmits a HARQ-ACK in response to reception of this data.

The information of the resource is included in the DL scheduling DCI or SL scheduling DCI transmitted from the base station 10 in the step S101. The terminal 20A acquires the information of the resource from the DL scheduling DCI or SL scheduling DCI, and causes this to be included in SCI. Otherwise, it is possible that the information of the resource is not included in the DCI transmitted from the base station 10. The terminal 20A may transmit the information of the resource autonomously in a form included in the SCI.

In a step S104, the terminal 20B transmits a HARQ-ACK for received data to the terminal 20A by use of the resource of the PSFCH specified by the received SCI.

In a step S105, the terminal 20A transmits the HARQ-ACK by use of the PUCCH resource specified by DL scheduling DCI (or SL scheduling DCI) at the timing (for example, timing of a slot unit) specified by the DL scheduling DCI (or the SL scheduling DCI). The base station 10 receives this HARQ-ACK. A codebook of this HARQ-ACK may include a HARQ-ACK received from the terminal 20B and a HARQ-ACK for the DL data. However, a HARQ-ACK for the DL data is not included in a case where there is no allocation of DL data or the like.

Figure 11:
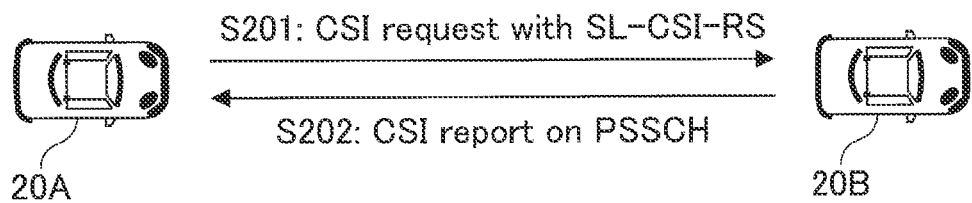
FIG. 11 is a diagram illustrating an example (1) of a configuration and operation of a radio communication system in an embodiment of the present invention.

FIG. 11 is a diagram illustrating an example (1) of a configuration and operation of a radio communication system in the embodiment of the present invention. Acquisition of a channel state in a sidelink may be performed by measuring an SL-CSI-RS (Sidelink Channel State Information Reference Signal) in the terminal 20.

In a step S201 illustrated in FIG. 11, the terminal 20A transmits an SL-CSI request for acquiring a channel state of the sidelink to the terminal 20B together with the SL-CSI-RS. Then the terminal 20B transmits an SL-CSI report to the terminal 20A via a PSSCH (S202). It is noted that the SL-CSI report may be transmitted to the base station 10 where the sidelink is scheduled.

In the step S202, assuming that a HARQ control is supported, a PSFCH corresponding to a PSSCH transmitted by the terminal 20B is transmitted by the terminal 20A to the terminal 20B.

For processing of a plurality of PSFCHs in the terminal 20, the following criteria (1) to (3) may be applied.

(1) In a case where there occurs an overlap between a PSFCH transmission and a PSFCH reception, an enabled PSFCH transmission or PSFCH reception is selected according to a priority order. The priority order for use may be a priority order of a PSCCH and PSSCH associated with the PSFCH.

(2) If PSFCH transmissions to a plurality of the terminals 20 occur, N enabled PSFCH transmissions are selected according to a priority order. The priority order for use may be a priority order of a PSCCH and PSSCH associated with the PSFCH. N may be predetermined, or may be configured by the base station 10.

(3) If a PSFCH including a plurality of HARQ responses is transmitted to the single terminal 20, information bits of the HARQ responses may be multiplexed and transmitted via the PSFCH, or N enabled HARQ responses may be selected according to a priority order. The priority order for use may be a priority order of a PSCCH and PSSCH associated with the PSFCH. N may be predetermined, or may be configured by the base station 10.

It is noted that, when the number of a plurality of PSFCHs that can be simultaneously transmitted by the terminal 20 is N, N may be one, or may be two or more.

An overlap of PSFCHs can be a serious problem. For example, if there occurs an overlap between a PSFCH transmission and a PSFCH reception, only either one of the PSFCH transmission or the PSFCH reception is executable because of restriction of half duplex. Also, if there occurs an overlap between PSFCH transmissions, it is likely that a larger MPR (Maximum Power Reduction) is adapted in a case of transmitting a plurality of PSFCHs simultaneously.

Thus, it is preferable to enhance reliability of transport block transmission by a HARQ response, and, at the same time, to decrease a HARQ response as much as possible to avoid an overlap of PSFCHs.

Figure 12:
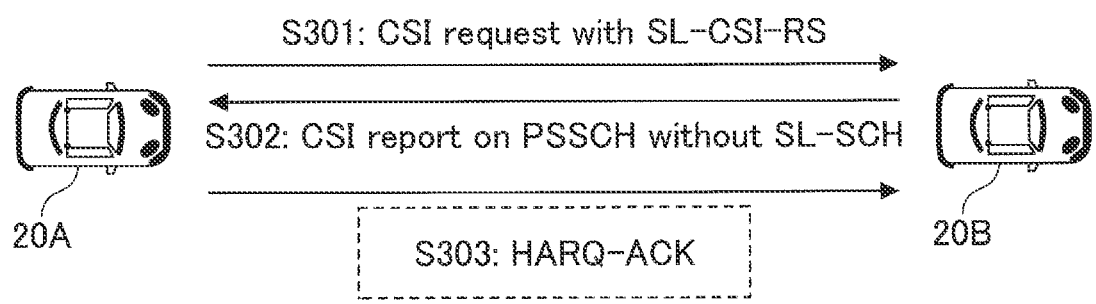
FIG. 12 is a diagram illustrating an example (2) of a configuration and operation of a radio communication system in the embodiment of the present invention.

Thus, different controls of a HARQ response may be applied between at the time of an SL-CSI report and at the time of transmission of a transport block. For example, a HARQ response corresponding to a PSSCH including SL-CSI need not be generated and need not be transmitted FIG. 12 is a diagram illustrating an example (2) of a configuration and operation of a radio communication system in the embodiment of the present invention. For example, a HARQ response corresponding to a PSSCH which includes SL-CSI and does not include an SL-SCH (Sidelink Shared Channel) (an "SL-SCH" and a "transport block" may be interchanged) need not (necessarily) be generated and transmitted.

In a step S301, the terminal 20A transmits an SL-CSI request for acquiring a channel state of the sidelink to the terminal 20B together with an SL-CSI-RS. It is noted in the present invention that an SL-CSI request and an SL-CSI-RS may be transmitted at different timing (for example, at different slots) to the terminal 20B. Also, an SL-CSI-RS may be replaced with a different signal (for example, DM-RS (De-Modulation Reference Signal)) in the present invention. Then the terminal 20B transmits an SL-CSI report without an SL-SCH to the terminal 20A via a PSSCH (S302). The terminal 20A, in a case of receiving an SL-CSI report without an SL-SCH via a PSSCH, need not transmit a HARQ response to the terminal 20B in a step S303. Also, the terminal 20A, in a case of receiving an SL-CSI report with an SL-SCH via a PSSCH, or receiving an SL-SCH via a PSSCH, may transmit a HARQ response to the terminal 20B in the step S303.

Also, for example, if an indication is included in the SCI indicating that no SL-CSI report is included, then the terminal 20A in the step S303 may generate a corresponding HARQ response and transmit this to the terminal 20B. Also, for example, if an indication indicating that an SL-SCH exists is included in SCI, then the terminal 20A in the step S303 may generate a corresponding HARQ response and transmit this to the terminal 20B. Also, for example, if an indication is included in the SCI indicating that an SL-CSI report is included, and if an indication is included in the SCI indicating that no SL-SCH exists is included, then the terminal 20A in the step S303 need not transmit a HARQ response to the terminal 20B. Also, for example, if an indication indicating that no SL-CSI report is included is not included in SCI, and if an indication indicating that an SL-SCH exists is not included in the SCI, then the terminal 20A in the step S303 need not transmit a HARQ response to the terminal 20B.

Figure 13:
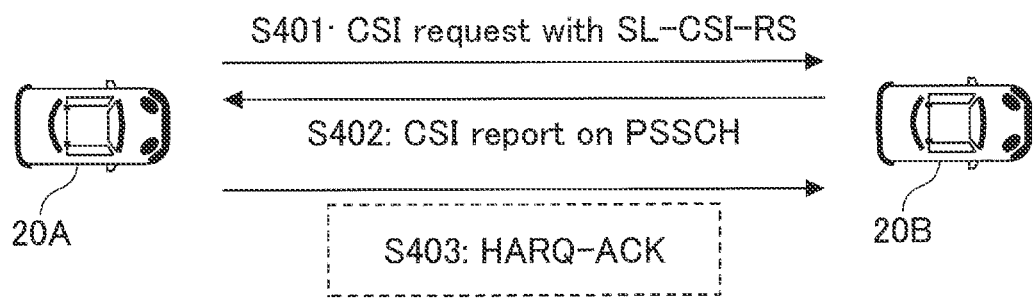
FIG. 13 is a diagram illustrating an example (3) of a configuration and operation of a radio communication system in the embodiment of the present invention.

FIG. 13 is a diagram illustrating an example (3) of a configuration and operation of a radio communication system in the embodiment of the present invention. For example, a HARQ response corresponding to a PSSCH which includes SL-CSI irrespective of whether there is an SL-SCH need not (necessarily) be generated and transmitted.

In a step S401, the terminal 20A transmits an SL-CSI request for acquiring a channel state of the sidelink to the terminal 20B together with an SL-CSI-RS. Then the terminal 20B transmits an SL-CSI report with an SL-SCH or an SL-CSI report without an SL-SCH, to the terminal 20A via a PSSCH (S402). The terminal 20A, in a case of receiving an SL-CSI report with an SL-SCH or an SL-CSI report without an SL-SCH via a PSSCH, need not transmit a HARQ response to the terminal 20B in a step S403.

Also, for example, if an indication is included in SCI indicating that no SL-CSI report, then the terminal 20A in the step S403 may generate a corresponding HARQ response and transmit this to the terminal 20B. Also, for example, if an indication is included SCI indicating that an SL-CSI report is included, then the terminal 20A in the step S403 need not transmit a HARQ response to the terminal 20B. Also, for example, if an indication indicating that no SL-CSI report is included is not included in SCI, then the terminal 20A in the step S403 need not transmit a HARQ response to the terminal 20B.

The control according to the HARQ response described with FIG. 12 or 13 allows the PSFCH transmission to decrease, so as to decrease occurrence of cases of half duplex, and perform reduction in MPR.

Figure 14:
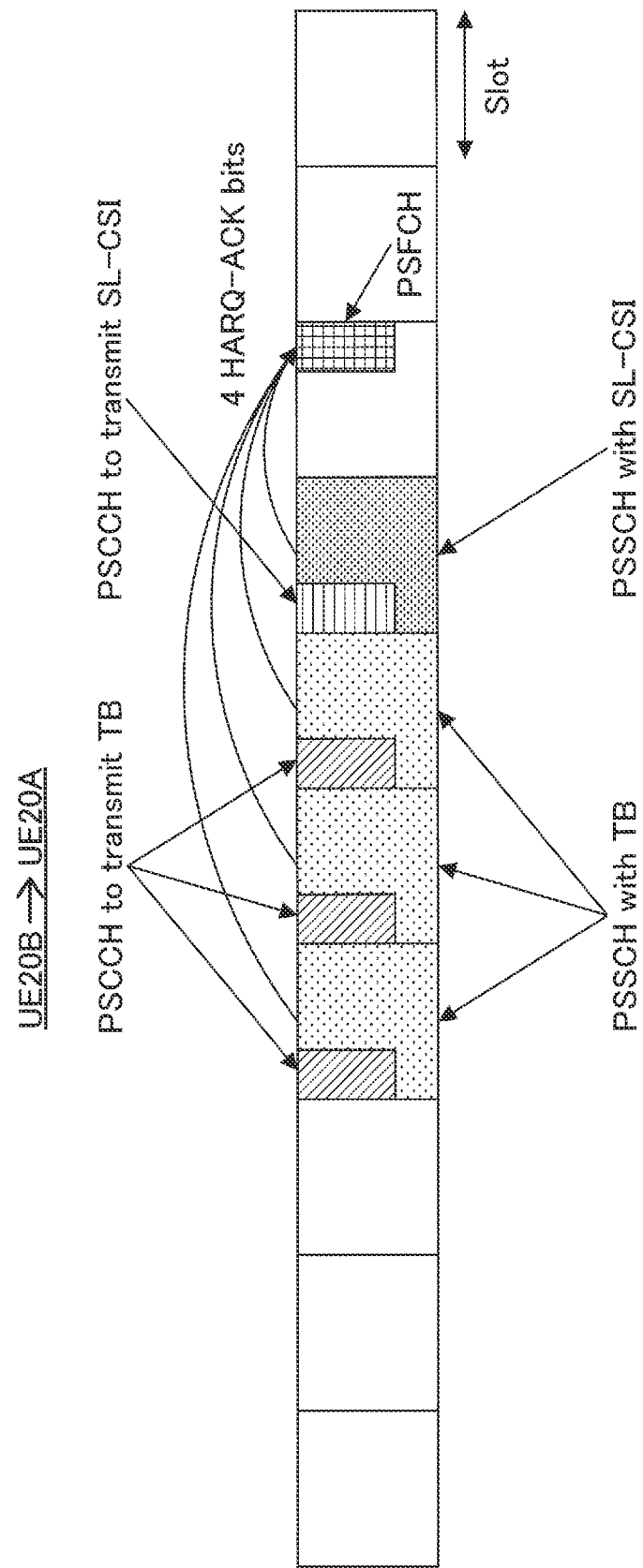
FIG. 14 is a diagram illustrating an example of arranging resources in the embodiment of the present invention.

FIG. 14 is a diagram illustrating an example of arranging resources in the embodiment of the present invention. As to whether a HARQ response corresponding to the SL-CSI report is generated and transmitted or not, it is possible to determine with dependency on whether plural bits of a HARQ response are multiplexed and transmitted in a PSFCH or not. It is noted that "generating a HARQ response" and "transmitting a HARQ response" may be read interchangeably.

As illustrated in FIG. 14, a PSCCH for transmitting a transport block and a PSSCH including the transport block are transmitted by the terminal 20B to the terminal 20A by three slots. Also, a PSCCH for transmitting an SL-CSI report and a PSSCH including the SL-CSI report are transmitted by the terminal 20B to the terminal 20A by one slot. The terminal 20A may multiplex a 4-bit HARQ response corresponding to the transport block of three slots and the SL-CSI report of one slot, and may transmit this to the terminal 20B via a PSFCH.

If plural bits of a HARQ response are multiplexed and transmitted in a PSFCH, then a HARQ response corresponding to a PSSCH including an SL-CSI report may be generated and may be transmitted. If plural bits of a HARQ response are not multiplexed in a PSFCH, then a HARQ response corresponding to a PSSCH including an SL-CSI report need not be generated and need not be transmitted.

A HARQ response corresponding to an SL-CSI report can be performed if it is unnecessary to decrease PSFCH transmission by control according to the HARQ response described by referring to FIG. 14.

It is noted that a HARQ response corresponding to an SL-CSI report may be generated and may be transmitted, by applying at least one of the conditions (a) to (f) below. Otherwise, a HARQ response corresponding to an SL-CSI report may be generated and may be transmitted irrespective of any of those conditions.

(a) A PSFCH corresponding to a PSCCH and PSSCH including an SL-CSI report may be assigned with the lowest priority, or lower priority than a PSFCH corresponding to a PSCCH and PSSCH only including a transport block.

(b) A PSFCH corresponding to a PSCCH and PSSCH only including an SL-CSI report and not including a transport block may be assigned with the lowest priority, or may be assigned with lower priority than a PSFCH corresponding to a PSCCH and PSSCH including an SL-CSI report and a transport block, or may be assigned with lower priority than a PSFCH corresponding to a PSCCH and PSSCH only including a transport block.

(c) A PSFCH corresponding to a PSCCH and PSSCH including an SL-CSI report may be assigned with priority correlated to an SL-CSI report configuration. Namely, the priority may be correlated to the SL-CSI report configuration.

(d) A PSFCH corresponding to a PSCCH and PSSCH including an SL-CSI report but not including an SL-SCH may be assigned with priority correlated to an SL-CSI report configuration. Namely, the priority may be correlated to the SL-CSI report configuration.

(e) The HARQ response corresponding to the SL-CSI report may be generated and may be transmitted only if a PSFCH transmitting a HARQ response corresponding to an SL-CSI report does not overlap with a PSFCH transmitting a HARQ response corresponding to a transport block. In contrast, if a PSFCH transmitting a HARQ response corresponding to an SL-CSI report overlaps with a PSFCH transmitting a HARQ response corresponding to a transport block, then the HARQ response corresponding to the SL-CSI report need not be generated and need not be transmitted.

(f) If the terminal 20 receiving a certain PSCCH and PSSCH is aware that the PSCCH and PSSCH include an SL-CSI report, and/or include a transport block, then a HARQ response corresponding to the PSCCH and PSSCH need not be generated and need not be transmitted. In contrast, the terminal 20 receiving a certain PSCCH and PSSCH is unaware that the PSCCH and PSSCH include an SL-CSI report, and/or include a transport block, then a HARQ response corresponding to the PSCCH and PSSCH may be generated and may be transmitted.

The priority in the above conditions may be notified by SCI. The SL-CSI report configuration above may be, for example, indicated by use of RRC signaling. Assuming that a HARQ response corresponding to a transport block collides with a HARQ response corresponding to an SL-CSI report, it is possible to drop a HARQ response corresponding to the SL-CSI report.

Figure 15:
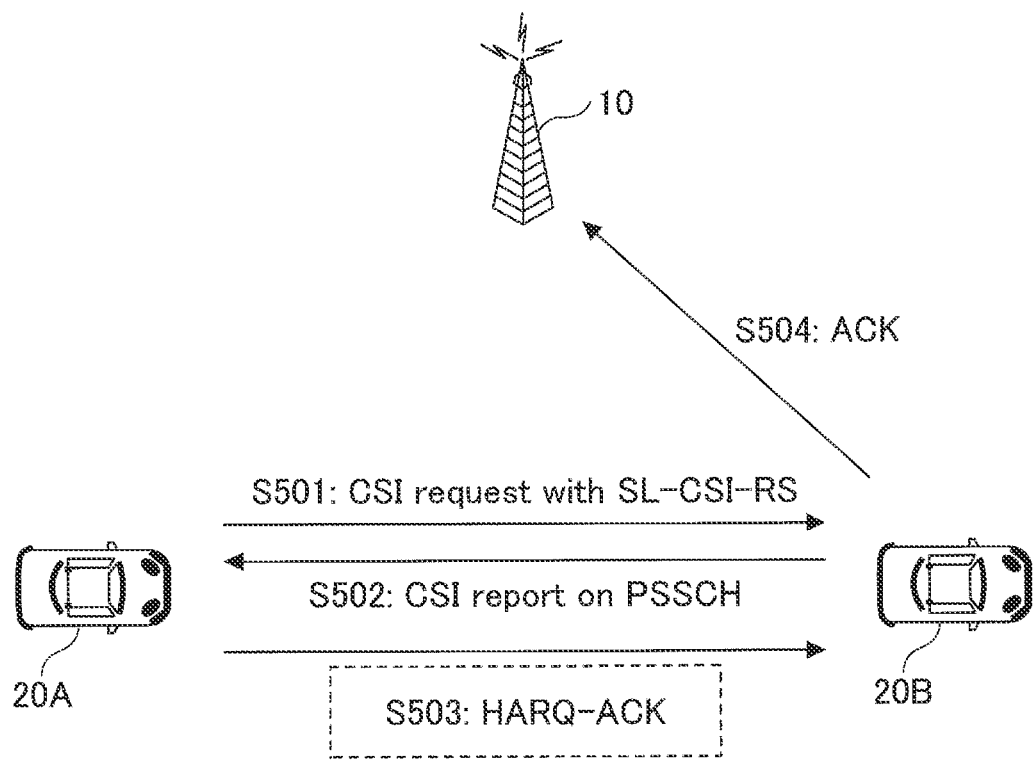
FIG. 15 is a diagram illustrating an example (4) of a configuration and operation of a radio communication system in the embodiment of the present invention.

FIG. 15 is a diagram illustrating an example (4) of a configuration and operation of a radio communication system in the embodiment of the present invention. A HARQ response corresponding to the SL-CSI report may be transmitted to the base station 10. For example, after transmitting the SL-CSI report to the terminal 20A via a PSSCH including or not including a transport block, the terminal 20B may transmit an ACK (affirmative response) to the base station 10 as a HARQ response corresponding to this PSSCH. It is noted that a "PSSCH" and "SL resource" in the present invention may be read interchangeably.

In a step S501, the terminal 20A transmits an SL-CSI request for acquiring a channel state of the sidelink to the terminal 20B together with the SL-CSI-RS. Then the terminal 20B transmits an SL-CSI report with an SL-SCH or an SL-CSI report without an SL-SCH, to the terminal 20A via a PSSCH (S502). The terminal 20A, in a case of receiving an SL-CSI report with an SL-SCH or an SL-CSI report without an SL-SCH via a PSSCH, need not transmit a HARQ response to the terminal 20B in a step S503. In a step S504, the terminal 20B may transmit an ACK to the base station 10.

Namely, the terminal 20B, even in the case of not receiving a HARQ response corresponding to an SL-CSI report, may transmit an ACK to the base station 10 as a HARQ response corresponding to an SL resource via a PUCCH or PUSCH.

Also, for example, contents of a HARQ response may be changed according to whether the terminal 20B receives or receives again an SL-CSI request at or after the time of the step S502. For example, if the terminal 20B receives or receives again an SL-CSI request within a predetermined period from the time of the step S502, then the terminal 20B may transmit a NACK (negative response) to the base station 10 as a HARQ response corresponding to an SL resource via a PUCCH or PUSCH. For example, if the terminal 20B receives or receives again an SL-CSI request within a predetermined period from the time of the step S502, and if a gap from a time point of receiving or receiving again an SL-CSI request until transmission of a HARQ response to the base station 10 is sufficient (for example, the gap is larger than a threshold X), then the terminal 20B may transmit a NACK to the base station 10 as a HARQ response corresponding to an SL resource via a PUCCH or PUSCH. In contrast, if the predetermined period has passed without receiving or receiving again an SL-CSI request at the terminal 20B from the time of the step S502, then the terminal 20B may transmit an ACK to the base station 10 as a HARQ response corresponding to an SL resource via a PUCCH or PUSCH.

If two or more SL-CSI requests are received within a predetermined time, then the contents of a HARQ response corresponding to an SL-CSI report transmitted to a first SL-CSI request may be changed to a NACK.

As has been described with FIG. 15, it is possible clearly to define UE operation related to a HARQ response to the base station 10 to which an SL-CSI report corresponds, by transmitting a HARQ response corresponding to the SL-CSI report to the base station 10.

It is noted that the HARQ response described with FIG. 15 need not be transmitted to the base station 10. Traffic can be further reduced because of not transmitting the HARQ response to the base station 10.

As to whether a HARQ response to which the SL-CSI report corresponds is generated and transmitted or not, it is possible to determine with dependency on a transmission mode or resource assignment mode. For example, in a case of the transmission mode 1, the above-described conditions (a) to (f) may be applied. For example, in a case of the transmission mode 2, it is possible to apply the method of not generating or transmitting a PSFCH which has been described with reference to FIGS. 12, 13 and 14.

As to whether a HARQ response to which the SL-CSI report corresponds is generated and transmitted or not, it is possible to determine with dependency on an enabled or disabled state of a HARQ response to the base station 10. For example, in a case where a HARQ response to the base station 10 is enabled, the above-described conditions (a) to (f) may be applied. In contrast, for example, in a case where a HARQ response to the base station 10 is disabled, it is possible to apply the method of not generating or transmitting a PSFCH which has been described with reference to FIGS. 12, 13 and 14.

According to the above-described embodiment, the terminal 20 can reduce a HARQ response to which the SL-CSI report corresponds according to a communication state. Also, the terminal 20 can assign priority to a HARQ response to which the SL-CSI report corresponds according to the communication state. Also, the terminal 20 can report a HARQ response to which the SL-CSI report corresponds to the base station 10 without receiving a PSFCH.

It is concluded that control of retransmission in the terminal-to-terminal direct communication can be determined according to a communication state.

[Equipment Configuration]

Next, a functional configuration example of the base station 10 and the terminal 20 that perform the processes and operations described above will be described. The base station 10 and the terminal 20 include functions for implementing the embodiment described above. However, the base station 10 and the terminal 20 may each comprise only some of the functions in the embodiment.

[Base Station 10]

Figure 16:
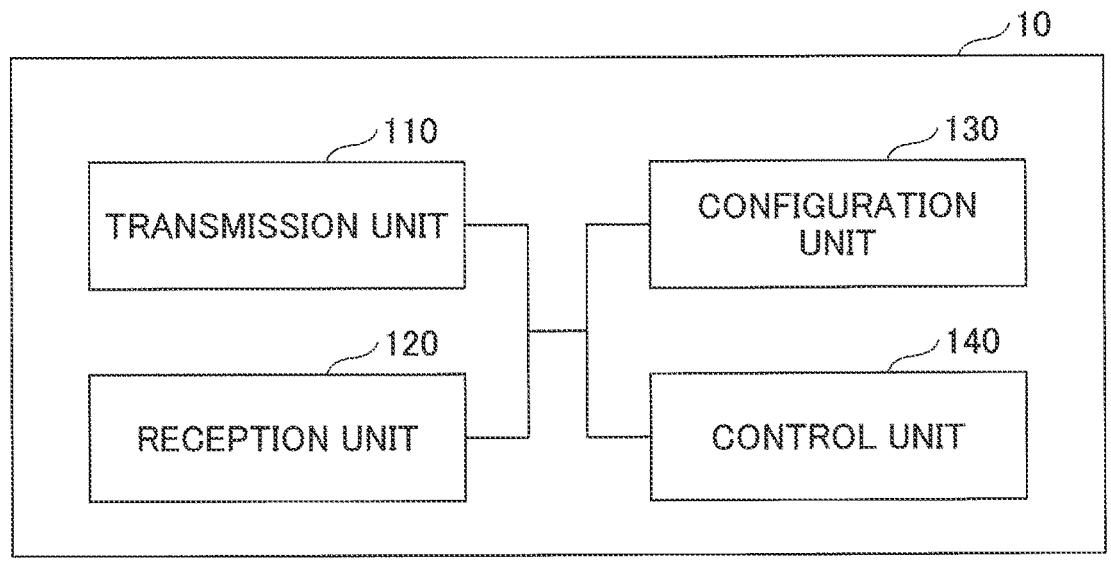
FIG. 16 is a diagram illustrating an example of a functional configuration of a base station 10 in the embodiment of the present invention.

FIG. 16 is a diagram illustrating an example of a functional configuration of the base station 10. As illustrated in FIG. 16, the base station 10 includes a transmission unit 110, a reception unit 120, a configuration unit 130 and a control unit 140. The functional configuration illustrated in FIG. 16 is only an example. Functional components may have any functional category or any name as long as the operation according to an embodiment of the present invention can be performed.

The transmission unit 110 includes a function for generating a signal to be transmitted to a side of the terminal 20, and transmitting the signal wirelessly. The reception unit 120 includes a function for receiving various signals transmitted from the terminal 20 and acquiring, for example, information of a higher layer from the received signals. The transmission unit 110 has a function to transmit NR-PSS, NR-SSS, NR-PBCH, DL/UL control signals, DL reference signal, or the like to the terminal 20.

The configuration unit 130 stores the preset configuration information and various elements of configuration information to be transmitted to the terminal 20 in a storage device, and reads out the information from the storage device as required. The contents of the configuration information are, for example, information related to configuration of D2D communication.

As described in the embodiment, the control unit 140 performs the control related to a configuration for the terminal 20 to perform D2D communication. Also, the control unit 140 transmits scheduling of D2D communication and DL communication to the terminal 20 through the transmission unit 110. Also, the control unit 140 receives information related to a HARQ response of D2D communication and DL communication from the terminal 20 through the reception unit 120. Furthermore, the control unit 140 receives a CSI report related to the D2D communication from the terminal 20 through the reception unit 120. A functional component related to signal transmission in the control unit 140 may be included in the transmission unit 110, and a functional component related to signal reception in the control unit 140 may be included in the reception unit 120.

[Terminal 20]

Figure 17:
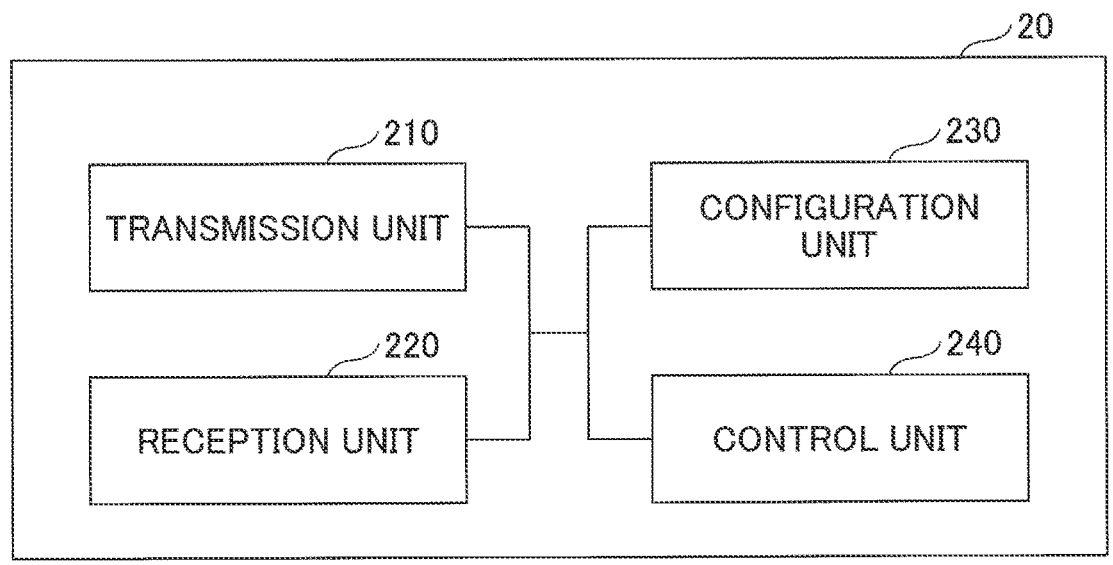
FIG. 17 is a diagram illustrating an example of a functional configuration of a terminal 20 in the embodiment of the present invention.

FIG. 17 is a diagram illustrating an example of a functional configuration of the terminal 20. As illustrated in FIG.

17, the terminal 20 includes a transmission unit 210, a reception unit 220, a configuration unit 230 and a control unit 240. The functional configuration illustrated in FIG. 17 is only one example. Functional components may have any functional category or any name as long as the operation according to an embodiment of the present invention can be performed.

The transmission unit 210 creates a transmission signal from data of transmission, and wirelessly transmits the transmission signal. The reception unit 220 receives various signals wirelessly and acquires signals from higher layers from the received signals of the physical layer. The reception unit 220 has a function to receive NR-PSS, NR-SSS, NR-PBCH, DL/UL/SL control signals or reference signals or the like transmitted from the base station apparatus 10. For example, the transmission unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another terminal 20 as D2D communication. The reception unit 220 receives PSCCH, PSSCH, PSDCH, PSDCH, PSBCH or the like from another terminal 20.

The configuration unit 230 stores various elements of configuration information received from the base station 10 or the terminal 20 by the reception unit 220 in a storage device, and reads out the information from the storage device as required. The configuration unit 230 also stores the preset configuration information. The contents of the configuration information are, for example, information related to configuration of D2D communication.

As described in the embodiment, the control unit 240 controls D2D communication with other terminals 20. Also, the control unit 240 performs processing related to a HARQ of D2D communication and DL communication. Also, the control unit 240 transmits information to the base station 10 in relation to a HARQ response of D2D communication and DL communication to other terminals 20 scheduled by the base station 10. Also, the control unit 240 may schedule D2D communication of other terminals 20. Also, the control unit 240 transmits a CSI report related to D2D communication together with SL-CSI-RS to the terminal 20 through the transmission unit 210. Also, the control unit 240 transmits a CSI report related to D2D communication to the terminal 20 or the base station 10 through the transmission unit 210. Functional components related to signal transmission in the control unit 240 may be included in the transmission unit 210, and functional components related to signal reception in the control unit 240 may be included in the reception unit 220.

[Hardware Configuration]

Block diagrams (FIGS. 16 and 17) used in the description of the above embodiment illustrate blocks of functional units. These functional blocks (components) are implemented by any combination of at least one of hardware and software. In addition, the implementation method of each function block is not particularly limited. That is, each functional block may be implemented by using a single device that is physically or logically combined. Two or more devices that are physically or logically separated may be directly or indirectly connected (e.g., by using wired, wireless, etc.), to implement each functional block by using these multiple devices. The functional block may be implemented by combining software with the single device or the plural devices.

Functions include, but are not limited to, judgment, decision, determination, calculation, computing, processing, derivation, research, search, verification, reception, transmission, output, access, resolution, selection, choosing, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the realization method is not particularly limited.

Figure 18:
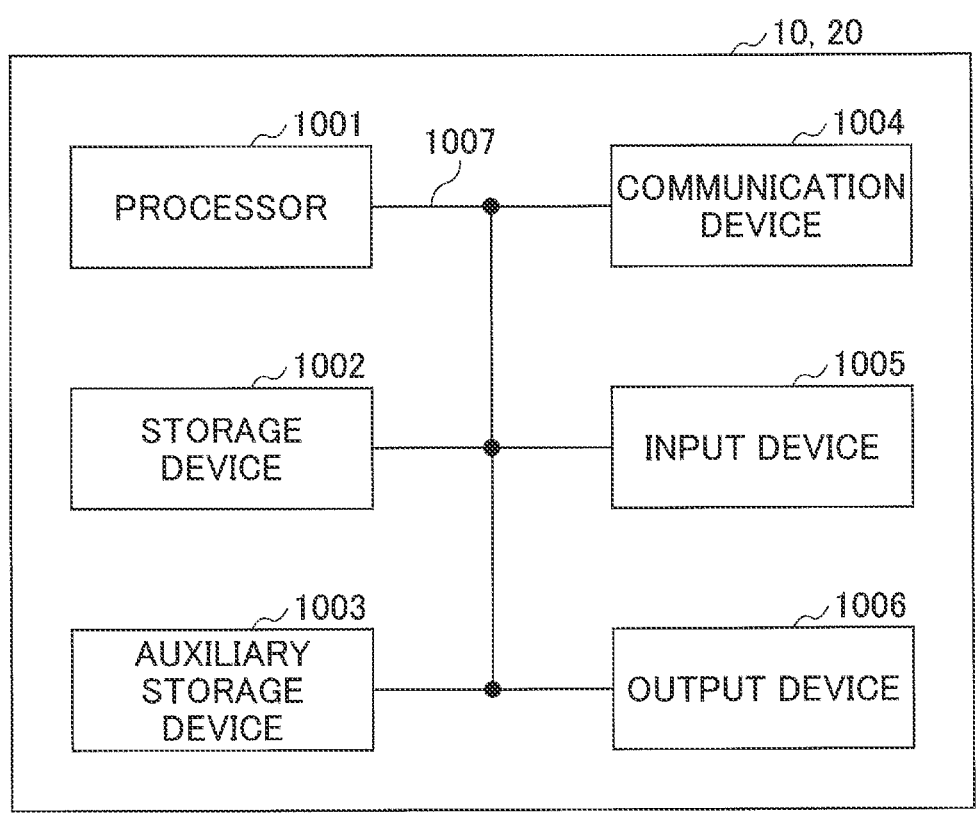
FIG. 18 is a diagram illustrating an example of a hardware configuration of the base station 10 or the terminal 20 in the embodiment of the present disclosure.

For example, the base station 10, the terminal 20 and the like according to an embodiment of the present disclosure may function as a computer for processing the radio communication method of the present disclosure. FIG. 18 is a diagram illustrating an example of the hardware configuration of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007 and the like.

In the following description, the term "apparatus" can be read as circuits, devices, units, and the like. The hardware configuration of the base station 10 and the terminal 20 may be configured to include one or more of the apparatuses illustrated in the drawings or may be configured without some of the apparatuses.

For each function in the base station 10 and the terminal 20, predetermined software (programs) is read on hardware such as the processor 1001 and the storage device 1002 to have the processor 1001 perform an operation. Each function in the base station 10 and the terminal 20 is realized by controlling communication with the communication device 1004 and controlling at least one of reading and writing of data in the storage device 1002 and the auxiliary storage device 1003.

The processor 1001 runs, for example, an operating system to control the entire computer. The processor 1001 may be constituted by a central processing unit (CPU) including an interface for peripheral devices, a controller, an arithmetic unit, a register, and the like. For example, the above-described control unit 140, control unit 240 and the like may be implemented by the processor 1001.

The processor 1001 reads out a program (program code), software module, data or the like from at least one of the auxiliary storage device 1003 and the communication device 1004 to the storage device 1002 and performs various steps of processing in accordance therewith. As a program, a program that causes a computer to execute at least a part of the operation described in the above-described embodiment is used. For example, the control unit 140 of the base station 10 illustrated in FIG. 16 may be implemented by a control program stored in the storage device 1002 and operating in the processor 1001. For example, the control unit 240 of the terminal 20 illustrated in FIG. 17 may be implemented by a control program stored in the storage device 1002 and operating in the processor 1001. Although it has been described that the foregoing processes are executed by one processor 1001, they may be executed simultaneously or sequentially by two or more processors 1001. The processor 1001 may be implemented by one or more chips. The program may be transmitted from the network via a telecommunication line.

A storage device 1002 is a computer-readable recording medium and may be constituted by at least one of, for example, ROM (Read Only Memory), EPROM (Erasable Programmable ROM), EEPROM (Electrically Erasable Programmable ROM), RAM (Random Access Memory), and the like. The storage device 1002 may be referred to as a register, cache, main memory (main storage device) or the like. The storage device 1002 can store programs (program code), software modules, etc., executable to implement a communication method according to an embodiment of the present disclosure.

The auxiliary storage device 1003 is a computer-readable recording medium, and may comprise at least one of an optical disk, such as a CD-ROM (Compact Disc ROM), a hard disk drive, a flexible disk, a magneto-optical disk (e.g., a compact disk, a digital versatile disk, a Blu-ray (registered trademark) disk), a smart card, a flash memory (e.g., a card, a stick, a keydrive), a floppy (registered trademark) disk, a magnetic strip and the like. The storage medium described above may be, for example, a database, a server, or other suitable medium that includes at least one of the storage device 1002 and the auxiliary storage device 1003.

The communication device 1004 is a hardware (transmitting/receiving device) for performing communication between computers via at least one of a wired network and a wireless network, and is also referred to as a network device, a network controller, a network card, a communication module or the like. The communication device 1004 may comprise a high frequency switch, duplexer, filter, frequency synthesizer or the like, for example, to implement at least one of a frequency division duplex (FDD) and a time division duplex (TDD). For example, the transmitting/receiving antenna, the amplifier unit, the transmitting/receiving unit, the transmission line interface and the like may be implemented by the communication device 1004. The transmitting/receiving unit may be physically or logically isolated implementations of the transmitters and receivers.

The input device 1005 is an input device (e.g., a keyboard, mouse, microphone, switch, button, sensor, etc.) that receives external inputs. The output device 1006 is an output device (e.g., a display, speaker, LED lamp, etc.) that implements external outputs. The input device 1005 and the output device 1006 may have an integrated configuration (for example, a touch panel).

Each device, such as the processor 1001 and the storage device 1002, is connected by the bus 1007 for communicating information. The bus 1007 may be constructed by using a single bus or may be constructed by using different buses between devices.

The base station 10 and the terminal 20 may also include hardware, such as a microprocessor, a digital signal processor (DSP), an ASIC (Application Specific Integrated Circuit), a PLD (Programmable Logic Device) and an FPGA (Field Programmable Gate Array). All or part of each function block may be realized by the hardware. For example, the processor 1001 may be implemented using at least one of these hardware devices.

Summary of the Embodiment

As described above, according to an embodiment of the present invention, a terminal that includes a transmission unit configured to transmit a CSI (Channel State Information) request and a reference signal for use in CSI measurement to another terminal, a reception unit configured to receive a CSI report that is based on a measurement result of the reference signal from the another terminal, and a control unit configured to determine control related to a HARQ (Hybrid automatic repeat request) response corresponding to the CSI report according to a communication state, is provided.

According to this configuration, the terminal 20 can reduce a HARQ response to which the SL-CSI report corresponds according to a communication state. Also, the terminal 20 can assign priority to the HARQ response to which the SL-CSI report corresponds according to the communication state. Namely, control of retransmission can be determined according to the communication state in terminal-to-terminal direct communication.

In a case where the reception unit does not receive a transport block together with the CSI report, the control unit need not transmit the HARQ response to the another terminal. According to this configuration, the terminal 20 can reduce a HARQ response to which the SL-CSI report corresponds in case of low necessity.

The control unit, in a case where HARQ responses are multiplexed and transmitted in a channel, may transmit the HARQ response corresponding to the CSI report to the another terminal via the channel. According to this configuration, the terminal 20 can reduce a HARQ response to which the SL-CSI report corresponds if influence of required additional resources is small.

The control unit may set priority of a channel of transmitting a HARQ response corresponding to the CSI report to lower than priority of a channel of transmitting a HARQ response corresponding to a transport block. According to this configuration, the terminal 20 can assign priority to the HARQ response to which the SL-CSI report corresponds according to necessity.

Also, according to an embodiment of the present invention, a terminal is provided, which comprises a reception unit configured to receive a CSI (Channel State Information) request and a reference signal for use in CSI measurement from another terminal, a transmission unit configured to transmit a CSI report that is based on a measurement result of the reference signal to the another terminal, and a control unit configured to transmit a HARQ (Hybrid automatic repeat request) response corresponding to the CSI report to a base station.

According to the above-described configuration, the terminal 20 can report a HARQ response to which the SL-CSI report corresponds to the base station 10 without receiving a PSFCH, according to a communication state. Namely, control of retransmission can be determined according to the communication state in terminal-to-terminal direct communication.

The control unit, in a case of not receiving, before lapse of a certain period, a CSI request from a time point of transmitting the CSI report by the transmission unit to the another terminal, may transmit an affirmative response to the base station, and in a case of receiving, before lapse of a certain period, a CSI request from a time point of transmitting the CSI report by the transmission unit to the another terminal, may transmit a negative response to the base station. According to this configuration, the terminal 20 can report the HARQ response to which the SL-CSI report corresponds to the base station 10 without receiving a PSFCH according to the communication state.

Supplement to the Embodiment

Although the embodiment of the present invention has been described heretofore, the disclosed invention is not limited to such an embodiment, and various variants, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention. The items described in two or more items may be used in combination as needed, or the items described in one item may be applied to the items described in another item (unless contradictory). The functional or processing component boundaries in the functional block diagrams do not necessarily correspond to the physical part boundaries. The operation of the plurality of functions of the functional components may be performed physically by one element, or the operation of one functional component may be performed physically by the plurality of elements. As for the processing procedure described in the embodiment, the order of steps of the processing may be changed unless contradictory. For convenience of process description, the base station 10 and the terminal 20 have been described by using functional block diagrams, but such devices may be implemented in hardware, software, or a combination thereof. Software operated by a processor of the base station 10 in accordance with the embodiment of the present invention and software operated by a processor of the terminal 20 in accordance with the embodiment of the present invention may be stored in a random access memory (RAM), flash memory, read-only memory (ROM), EPROM, EEPROM, register, hard disk (HDD), removable disk, CD-ROM, database, server or any other suitable storage medium.

Information may also be indicated in other ways, as well as in the aspect/embodiment described in this disclosure. For example, indication of information may be performed by physical layer signaling (e.g., DCI (Downlink Control Information) or UCI (Uplink Control Information)), upper layer signaling (e.g., RRC (Radio Resource Control) signaling, MAC (Medium Access Control) signaling, broadcast information (MIB (Master Information Block) or SIB (System Information Block)), other signals, or a combination thereof. Also, RRC signaling may be referred to as RRC messages, e.g., RRC Connection Setup messages, RRC Connection Reconfiguration messages, etc.

Each aspect/embodiment described in this disclosure may be applied to at least one of: LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), the systems utilizing other appropriate systems, and the next generation systems extended on the basis thereof. Multiple systems may also be applied in combination (e.g., at least one of LTE and LTE-A in combination with 5G, etc.).

The processing procedures, sequences, flowcharts, etc. of each aspect/embodiment described herein may be reordered unless contradictory. For example, the methods described in the present disclosure are provided by using exemplary sequences to present elements of the various steps, and are not limited to the particular presented sequence.

The particular operation herein described as performed by the base station 10 may in some instances be performed by its upper node. In a network of one or more network nodes having the base station 10, it will be apparent that various operations performed for communication with the terminal 20 can be performed by at least one of the base station 10 and other network nodes other than the base station 10 (e.g., MME, S-GW, etc., but not limited thereto). Although the above description has illustrated that there is only one other network node other than the base station 10, the other network nodes may be a combination (e.g., MME and S-GW) of a plurality of other network nodes.

The information or signals described in this disclosure can be output from a higher layer (or lower layer) to a lower layer (or higher layer), and may be input and output through multiple network nodes.

Input and output information may be stored in a specific location (e.g., memory) or managed by using management tables. Input and output information may be overwritten, updated, or added. Output information may be deleted. The input information or the like may be transmitted to another device.

The determination in this disclosure may be made by a value (0 or 1) expressed in 1 bit, by a true or false value (Boolean: true or false), or by a numerical comparison (e.g., a comparison with a predetermined value).

Software, whether referred to as software, firmware, middleware, microcode, hardware description language, or any other name, should be broadly interpreted to mean instructions, sets of instructions, code, code segments, program code, programs, subprograms, software modules, applications, software applications, software packages, routines, subroutines, objects, executable files, executable threads, procedures, functions, and the like.

Software, instructions, information, and the like may also be transmitted/received via a transmission medium. For example, assuming that software is transmitted from a website, server, or other remote source by using at least one of wireline technology (such as coaxial cable, fiber optic cable, twisted pair, digital subscriber line (DSL), etc.) and wireless technology (infrared, microwave, etc.), at least one of these wireline technology and wireless technology is included within the definition of a transmission medium.

The information, signals and the like described in this disclosure may be represented by using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). Also, the signal may be a message. The component carrier (CC) may also be referred to as a carrier frequency, cell, frequency carrier, or the like.

The terms "system" and "network" as used in this disclosure are used interchangeably.

The information, parameters and the like described in the present disclosure may also be expressed by using absolute values, relative values from predetermined values, or may be expressed by using corresponding separate information. For example, radio resources may be those indicated by an index.

The names used for the parameters described above are not restrictive in any respect. In addition, the mathematical equations using these parameters may differ from those explicitly disclosed in this disclosure. Since the various channels (e.g., PUCCH, PDCCH, etc.) and information elements can be identified by any suitable name, the various names assigned to these various channels and information elements are not in any way limiting.

In this disclosure, the terms "Base Station (BS)", "wireless base station", "base station", "fixed station", "NodeB", "eNodeB (eNB)", "gNodeB (gNB)", "access point", "transmission point", "reception point", "transmission/reception point", "cell", "sector", "cell group", "carrier", "component carrier" and the like may be used interchangeably. The base station may be referred to in terms such as macrocells, small cells, femtocells, picocells and the like.

The base station can accommodate one or more (e.g., three) cells. If the base station accommodates a plurality of cells, the entire coverage area of the base station can be divided into a plurality of smaller areas, each smaller area can also provide communication services by means of a base station subsystem (e.g., an indoor small base station (RRH: a Remote Radio Head). The term "cell" or "sector" refers to a portion or all of the coverage area of at least one of the base station and base station subsystem that provides communication services at the coverage.

In this disclosure, terms such as "mobile station (MS)", "user terminal", "user equipment (UE)", "terminal", and the like may be used interchangeably.

The mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base station and the mobile station may be referred to as a transmission device, reception device, communication device, or the like. At least one of the base station and the mobile station may be a device mounted on the mobile body, a mobile body itself, or the like. The mobile body may be a vehicle (e.g., a car, airplane, etc.), an unmanned mobile body (e.g., a drone, automated vehicle, etc.), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be read as the user terminal. For example, each aspect/embodiment of the present disclosure may be applied to a configuration in which communication between a base station and a user terminal is replaced by communication between multiple terminals 20 (e.g., what may be referred to as D2D (Device-to-Device), V2X (Vehicle-to-Everything), etc.). In this case, the terminal 20 may be configured to have the function provided in the base station 10 described above. Also, the terms "uplink" and "downlink" may be replaced by the terms corresponding to terminal-to-terminal communication (e.g., "side"). For example, an uplink channel, a downlink channel, or the like may be read as a side channel.

Similarly, the user terminal in the present disclosure may be read as the base station. In this case, the base station may be configured to have the functions provided by the user terminal described above.

As used in this disclosure, the terms "determining" and "determining" may encompass a wide variety of operations. For example, "determining" and "decision" may include deeming matters such as judging, calculating, computing, processing, deriving, investigating, searching (looking up, search and inquiry) (e.g., searching in tables, databases, or other data structures), and ascertaining to be "determining" and "decision". Also, "determining" and "decision" may include deeming matters such as receiving (e.g., receiving information), transmitting (e.g., sending information), input, output, and accessing (e.g., accessing data in a memory) to be "determining" and "decision". Also, "determining" and "decision" may include deeming matters such as resolving, selecting, choosing, establishing, comparing, etc. to be "determining" and "decision". That is, the "determining" and the "decision" may include deeming some action to be "determining" and "decision". "Decision" may be read as "assuming", "expecting", "considering", etc.

The term "connected" or "coupled" or any variation thereof means any direct or indirect connection or coupling between two or more elements, and may include the presence of one or more intermediate elements between two elements "connected" or "coupled" with each other. The coupling or connection between the elements may be physical means, logical means, or a combination of these. For example, "connection" may be read as "access". As used in the present disclosure, the two elements may be thought of as being "connected" or "coupled" to each other by using at least one of the one or more wires, cables, and printed electrical connections and, as a number of non-limiting and non-inclusive examples, electromagnetic energy having wavelengths in the radio frequency region, the microwave region and the light (both visible and invisible) region.

The reference signal may be abbreviated as RS (Reference Signal) or may be referred to as a pilot, depending on the standards applied.

As used in this disclosure, the expression "based on" does not mean "solely based on" unless otherwise specified. In other words, the expression "based on" means both "solely based on" and "at least based on".

Even in use of any reference to an element using a designation such as "first" or "second" used in the present disclosure, this does not generally limit the amount or order of those elements. These designations can be used in the present disclosure as a convenient way to distinguish between two or more elements. Thus, references to the first and second elements do not imply that only two elements may be employed or that the first element must precede the second element in some way.

"Means" in the configuration of each of the above devices may be replaced by "parts", "circuits", "devices", etc.

When the terms "include", "including" and variations thereof are used in the present disclosure, these terms are intended to be comprehensive as well as the term "comprising". Furthermore, the term "or" as used in this disclosure is not intended to be an exclusive-OR.

A radio frame may consist of one or more frames in the time domain. Each frame or frames in the time domain may be referred to as subframes. The subframe may further comprise one or more slots in the time domain. The subframe may be a fixed length of time (e.g., 1 ms) independent of a numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, certain filtering processing performed by a transmitter/receiver in the frequency domain, and specific windowing processing performed by the transmitter/receiver in the time domain.

The slot may consist of one or more symbols (such as OFDM (Orthogonal Frequency Division Multiplexing) symbols, SC-FDMA (Single Carrier Frequency Division Multiple Access) symbols, and the like) in the time domain. The slot may be in time units based on a numerology.

The slots may include a plurality of minislots. Each minislot may be constituted by one or more symbols in the time domain. The minislot may also be referred to as a subslot. The minislots may consist of fewer symbols than the slots. A PDSCH (or PUSCH) transmitted in time units greater than a minislot may be referred to as a PDSCH (or PUSCH) mapping type A. PDSCH (or PUSCH) transmitted by using minislots may be referred to as PDSCH (or PUSCH) mapping type B.

Radio frames, subframes, slots, minislots and symbols all represent time units for transmitting signals. Radio frames, subframes, slots, minislots and symbols may be designated by separate terms corresponding thereto respectively.

For example, one subframe may be referred to as a Transmission Time Interval (TTI). Multiple consecutive subframes may be referred to as a TTI. One slot or one minislot may be referred to as a TTI. That is, at least one of the subframes and the TTI may be a subframe (1 ms) in an existing LTE, a period shorter than 1 ms (e.g., 1-13 symbols), or a period longer than 1 ms. The unit representing the TTI may be referred to as a slot, a minislot or the like, in place of a subframe.

The TTI refers, for example, to the minimum time unit for scheduling in wireless communication. For example, in an LTE system, the TTI refers to scheduling of a base station for each terminal 20 to allocate radio resources (such as frequency bandwidth, power for transmission, etc. usable in each terminal 20) in TTI units. The definition of the TTI is not limited thereto.

The TTI may be a transmission time unit, such as a channel-encoded data packet (transport block), code block, codeword or the like, or may be a unit of a process, such as a scheduling or link adaptation. When a TTI is provided, a time section (e.g., the number of symbols) during which the transport block, code block, codeword or the like is actually mapped may be shorter than the TTI.

If one slot or one minislot is referred to as a TTI, one or more TTIs (i.e., one or more slots or one or more minislots) may be the minimum time unit for scheduling. The number of slots (minislots) constituting this minimum time unit of the scheduling may also be controlled.

A TTI having a time length of 1 ms may be referred to as a standard TTI (usually a TTI in LTE Rel. 8-12), a normal TTI, a long TTI, an ordinary subframe, a normal subframe, a long subframe, a slot, and the like. A TTI that is shorter than the standard TTI may be referred to as a shortened TTI, a short TTI, a partial TTI (partial or fractional TTI), a shortened subframe, a short subframe, a minislot, a subslot, a slot, or the like.

The long TTI (e.g., normal TTI, subframe, etc.) may be interpreted as a TTI having a time length over 1 ms. The short TTI (e.g., shortened TTI, etc.) may be interpreted as a TTI having a TTI length less than the TTI length of the long TTI and a TTI length equal to or greater than 1 ms.

Resource blocks (RBs) are resource allocation units for the time domain and frequency domain and may include one or more consecutive subcarrier waves (subcarriers) in the frequency domain. The number of subcarriers included in the RB may be the same, regardless of the numerology, and, for example, may be 12. The number of subcarriers included in the RB may be determined on the basis of numerology.

The time domain of the RB may also include one or more symbols, and may have a length of one slot, one minislot, one subframe or one TTI. One TTI, one subframe, etc., may each consist of one or more resource blocks.

It is noted that one or more RBs may be referred to as physical resource blocks (PRBs: physical RBs), subcarrier groups (SCGs), resource element groups (REGs), PRB pairs, RB pairs, and the like.

Also, resource blocks may also consist of one or more resource elements (RE). For example, one RE may be a radio resource area of one subcarrier and one symbol.

The bandwidth part (BWP) (which may also be referred to as a partial bandwidth, etc.) may represent a subset of consecutive common RBs (common resource blocks) for a certain numerology in a certain carrier. It is noted that the common RBs may be identified by an index of an RB relative to the common reference point of this carrier. A PRB is defined in a certain BWP and may be numbered within the same BWP.

A BWP may include a BWP for UL (UL BWP) and a BWP for DL (DL BWP). For the terminal 20, one or more BWPs may be configured in one carrier.

At least one of the configured BWPs may be active, and the terminal 20 need not assume that it will transmit/receive predetermined signals/channels outside the active BWP. The terms "cell" and "carrier" in this disclosure may be read as "BWP".

Structures such as radio frames, subframes, slots, minislots, and symbols described above are only exemplary. For example, it is possible to vary the number of subframes included in a radio frame, the number of slots per subframe or radio frame, the number of minislots included in the slot, the number of symbols and RBs included in the slot or minislot, the number of subcarriers included in the RB, the number of symbols in the TTI, the symbol length, the length of the cyclic prefix (CP) length, and the like.

In the present disclosure, where an article is added by translation, for example a, an, and the in English, the disclosure may include that the noun following these articles is in a plural form.

In this disclosure, the words "A and B are different" may mean that "A and B are different from each other." Furthermore, those words may mean that "each of A and B is different from C". Terms such as "separated" or "combined" may be interpreted as well as "different".

The aspects/embodiments described in this disclosure may be used alone, in combination, or switched with implementation. Indication of given information (e.g. indication of "being X") may also be performed by an explicit manner, but also by an implicit manner (e.g. without indicating the given information).

In the present disclosure, a HARQ response is one example of a response of control of retransmission. An ACK is one example of an affirmative response. A NACK is one example of a negative response. An SL-CSI-RS is one example of a reference signal for use in CSI measurement.

While the present disclosure has been described in detail above, it is apparent to those skilled in the art that the present disclosure is not limited to the embodiment described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

REFERENCE SIGNS LIST

10: base station
110: transmission unit
120: reception unit

130: configuration unit
140: control unit
20: terminal
210: transmission unit
220: reception unit
230: configuration unit
240: control unit
1001: processor
1002: storage device
1003: auxiliary storage device
1004: communication device
1005: input device
1006: output device

The invention claimed is:

1. A terminal comprising:
a receiver configured to receive a Channel State Information (CSI) request in terminal-to-terminal communication, from another terminal;
a transmitter configured to transmit at least one of a report for the CSI request and data in the terminal-to-terminal communication, to the other terminal; and
a processor configured to disable a response related to retransmission control to be received from the other terminal in a case where only the report for the CSI request is to be transmitted to the other terminal from among the report for the CSI request and the data,
wherein the receiver receives the response related to the retransmission control in a case where at least the data is transmitted to the other terminal and where the response related to the retransmission control is enabled, and
wherein the transmitter is further configured to transmit, to a base station, an affirmative response as a response related to the retransmission control via an uplink channel in a case where only the report for the CSI request is transmitted to the other terminal from among the report for the CSI request and the data.

2. The terminal as claimed in claim 1, wherein the transmitter is further configured to transmit, to the base station, the response related to retransmission control via the uplink channel in a case where only the response for the CSI request is transmitted to the other terminal from among the report for the CSI request and the data, and the receiver does not receive a response related to the retransmission control, from the other terminal.

3. A communication system comprising: a first terminal; and a second terminal, wherein
the first terminal includes:
a receiver configured to receive a Channel State Information (CSI) request in terminal-to-terminal communication, from the second terminal;
a transmitter configured to transmit, to the second terminal, at least one of a report for the CSI request and data in the terminal-to-terminal communication; and
a processor configured to disable a response related to retransmission control to be received from the second terminal in a case where only the report for the CSI request is transmitted to the second terminal from among the report for the CSI request and the data,
wherein the receiver receives, from the second terminal, the response related to the retransmission control in a case where at least the data is transmitted to the second terminal and where the response related to the retransmission control is enabled, and
wherein the transmitter is further configured to transmit, to a base station, an affirmative response as a response related to the retransmission control via an uplink channel in a case where only the report for the CSI request is transmitted to the second terminal from among the report for the CSI request and the data, and
the second terminal includes:
a transmitter configured to transmit, to the first terminal, the CSI request and the response related to the retransmission control; and
a receiver configured to receive, from the first terminal, at least one of the report for the CSI request and the data in the terminal-to-terminal communication.

4. A communication method of a terminal, the communication method comprising:
receiving a Channel State Information (CSI) request in terminal-to-terminal communication, from another terminal;
transmitting at least one of a report for the CSI request and data in the terminal-to-terminal communication, to the other terminal; and
disabling a response related to retransmission control to be received from the other terminal in a case where only the report for the CSI request is to be transmitted to the other terminal from among the report for the CSI request and the data,
wherein the receiving includes receiving the response related to the retransmission control in a case where at least the data is transmitted to the other terminal and where the response related to the retransmission control is enabled, and
wherein the transmitting includes transmitting, to a base station, an affirmative response as a response related to the retransmission control via an uplink channel in a case where only the report for the CSI request is transmitted to the other terminal from among the report for the CSI request and the data.

* * * * *